United States Patent Office 3,311,583
Patented Mar. 28, 1967

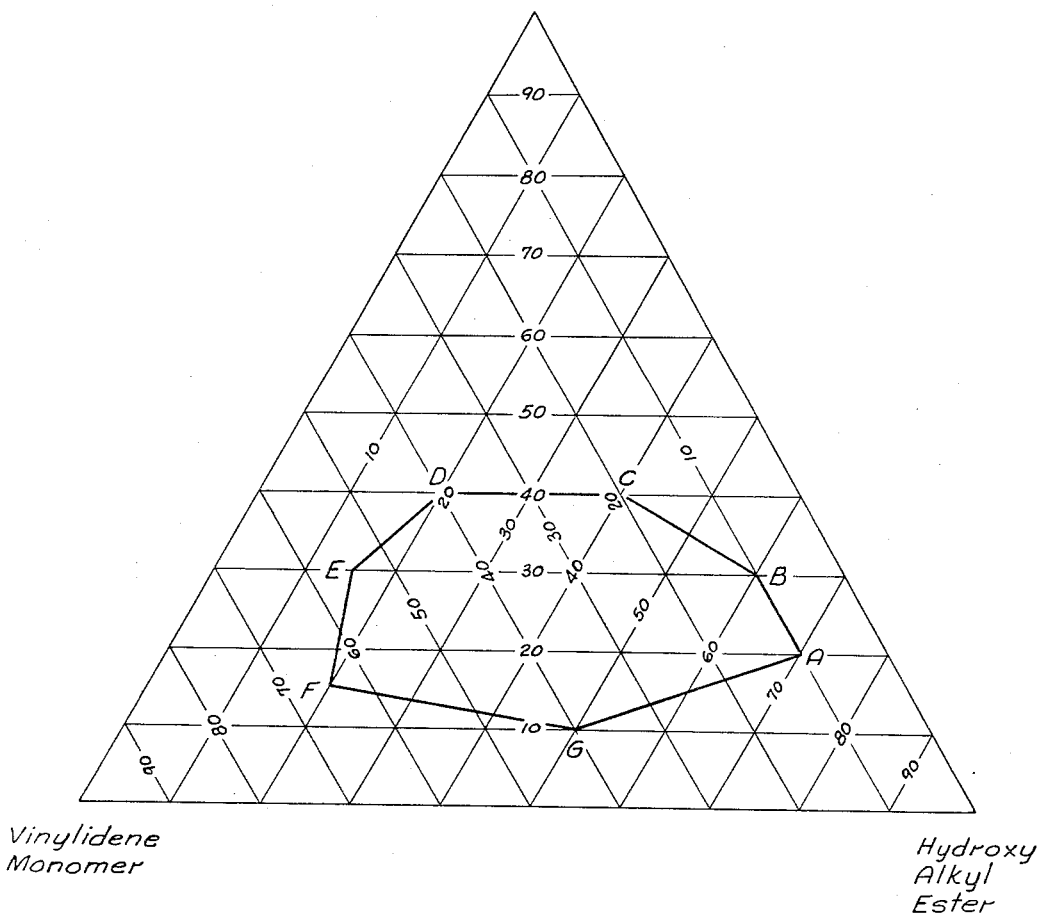

3,311,583
TERPOLYMER ACRYLATES-ACRYLIC ACID-HYDROXYALKYL ESTERS OF ACRYLIC ACID
Charles R. Bearden, Lake Jackson, Tex., assignor to The Dow Chemical Company, Midland, Mich., a corporation of Delaware
Filed Nov. 6, 1963, Ser. No. 321,738
20 Claims. (Cl. 260—29.6)

This invention concerns soluble interpolymers containing both hydroxyl and carboxylic acid groups which polymers are capable of being converted into insoluble polymeric materials upon heating at elevated temperatures, and pertains to a method of making the interpolymers.

It is a primary object of the invention to provide thermosettable interpolymers containing both hydroxyl groups and carboxyl groups, preferably both groups in the same polymer molecule, which thermosettable polymers are soluble in organic solvents and/or water, particularly water-miscible lower aliphatic alcohols or mixtures of such alcohols and water, and which polymers are readily converted to an insoluble cross-linked polymeric product upon heating at elevated temperatures, e.g. at 100° C. or above. It is another object of the invention to provide a method for making the soluble interpolymers containing both hydroxyl groups and carboxyl groups in the polymer molecules. Other and related objects may appear from the following description of the invention.

According to the invention, the foregoing and related objects are obtained by polymerizing (1) a monomer selected from the group consisting of (a) an ester of acrylic acid or methacrylic acid and a saturated aliphatic alcohol having from one to eight carbon atoms, and (b) a monovinyl aromatic hydrocarbon of the benzene series, (2) an acid selected from the group consisting of acrylic acid and methacrylic acid, and (3) an hydroxyalkyl ester selected from the group consisting of hydroxyethyl, hydroxypropyl and hydroxybutyl esters of acrylic and methacrylic acid, in contact with one another while having the reactants dissolved in a liquid solvent and reaction medium, preferably water or a water-miscible lower aliphatic alcohol having from one to four carbon atoms, or a mixture of water and such alcohols.

The esters of acrylic acid and/or methacrylic acid to be employed as starting materials can be an ester of a saturated aliphatic alcohol having from one to eight carbon atoms, and said acids. Examples of suitable esters are ethyl acrylate, methyl acrylate, propyl acrylate, butyl acrylate, isobutyl acrylate, 2-ethylhexyl acrylate, methyl methacrylate, butyl methacrylate and 2-ethylhexyl methacrylate. Such esters can be used in proportions corresponding to from 10 to 65 percent by weight of the sum of the polymerizable monomer ingredients and within the lines ABCDEFG of the trilinear diagram of the drawing as is more fully hereinafter described.

The esters just mentioned can be replaced in whole or in part by one or more monovinyl aromatic hydrocarbons of the benzene series having the general formula

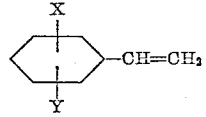

wherein X and Y each represent hydrogen and alkyl radicals having from 1 to 4 carbon atoms. Examples of suitable monovinyl aromatic hydrocarbons are styrene, vinyltoluene, vinylxylene, isopropylstyrene, ar-ethylvinylbenzene, tert.-butylstyrene, sec.-butylstyrene, di-tert.-butylstyrene, di-isopropylstyrene and diethylvinylbenzene.

The acrylic or methacrylic acid or a mixture of such acids can be used in proportions of from 10 to 40 percent by weight of sum of the polymerizable monomer ingredients and within the lines ABCDEFG of the trilinear diagram of the drawing.

The hydroxylalkyl ester of acrylic acid or methacrylic acid can be an ester such as 2-hydroxyethyl acrylate, 2-hydroxypropyl acrylate, 3-hydroxypropyl acrylate, 2-hydrobutyl acrylate, 4-hydroxybutyl acrylate, 2-hydroxyethyl methacrylate, 2-hydroxypropyl methacrylate, 3-hydroxypropyl methacrylate, 2-hydroxybutyl methacrylate, 4-hydroxybutyl methacrylate, 2-hydroxyisobutyl acrylate, or 2-hydroxyisobutyl methacrylate. The hydroxyalkyl ester can be employed in proportions of from 15 to 70 percent by weight of the sum of the polymerizable monomer material and within the lines ABCDEFG of the trilinear diagram of the drawing.

The interpolymers can be prepared by polymerizing the monomer ingredients while dissolved in a liquid reaction medium, preferably a liquid reaction medium that is a solvent for both the monomer and the polymer such as a lower aliphatic alcohol or a mixture of a lower aliphatic alcohol and water. Examples of suitable alcohols are methyl alcohol, ethyl alcohol, propyl alcohol, isopropyl alcohol, butyl alcohol, sec-butyl alcohol and tert.-butyl alcohol. The water miscible saturated aliphatic alcohols containing from 1 to 4 carbon atoms are preferred.

The interpolymers can be prepared by polymerizing the monomers in any desired sequence or order, or by adding all of the monomers at once to the reaction. For example, the monomeric acid can be first added to the reaction and partially or completely polymerized, after which another of the monomeric components, e.g. the alkyl ester, is added and the polymerization continued until a further portion of the monomers are polymerized or until the monomers are completely or substantially polymerized, after which the hydroxyalkyl ester component is added and the polymerization is continued until all or substantially all of the monomers are polymerized. The interpolymers are preferably prepared by blending or mixing all of the monomeric ingredients with one another in the initial startup of the polymerization reaction and continuing of the polymerization reaction until all or substantially all of the monomers are polymerized or are in chemically combined form.

The polymerization reaction can be carried out batchwise or in continuous manner and at atmospheric, subatmospheric or superatmospheric pressures and at temperatures between about 60° and 120° C.

The interpolymers can be recovered from the liquid reaction medium in which they are prepared in usual ways, e.g. by evaporating the solvent under vacuum and recovering the polymer as residue. The solutions of the polymers can be used per se as coatings or they can be mixed or blended or compounded with other ingredients such as pigments, dyes, coloring agents, fillers, plasticizing agents, light stabilizing agents, antioxidants and the like to form compositions suitable for use as baking enamels for wood and metal surfaces. Such compositions can be applied in known ways, such as by spraying, brushing or dipping and dried to form continuous films or coatings, which upon heating at elevated temperatures, are converted into insoluble cross-linked coatings, possessing high resistance to impact, cracking, and peeling, and which are insoluble in water and usual organic solvents such as gasoline, carbon tetrachloride, alcohol, acetone, benzene and the like.

The solutions of the interpolymers of the invention and the enamels produced therefrom, possess excellent storage life. They have been stored at room temperature in closed containers for periods of six months without evidence of gelation or increase in viscosity, when examined after such storage period.

The following examples illustrate ways in which the principle of the invention has been applied, but are not to be construed as limiting its scope:

*Example 1*

A charge of 23 grams of acrylic acid, 26 grams of 2-hydroxyethyl acrylate and 17 grams of ethyl acrylate, together with 90 grams of isopropyl alcohol, 45 grams of distilled water and 1 ml. of hydrogen peroxide, was sealed in a glass bottle. The monomers were polymerized heated in a water bath at a temperature of 65° C., while agitating the contents thereof by tumbling the bottle or rotating it end over end in said bath for a period of 12 hours to polymerize the monomers. The product was a colorless solution of the copolymer dissolved in the water-isopropanol reaction medium. The solution had a viscosity of 2 centistokes at 25° C.

Test panels of No. 26 gauge bonderized steel sheet were coated on one side with the polymer solution. The coating was dried in air for 30 minutes, then was baked for 30 minutes at 350° F. in an oven. The cured or baked film did not break or crack when the coated panel was bent around a ⅛" conical mandrel, thereby showing good adhesion and flexibility of the film. The Izod impact resistance of the film from both front and reverse sides was greater than 30 inch pounds. The cured film had excellent resistance to acetone and toluene at 75° F. after 30 minutes exposure, and had excellent resistance to water after exposure thereto at 90° F. for 10 days.

*Example 2*

In each of a series of experiments, a charge of 66 grams of ethyl acrylate, acrylic acid and 2-hydroxyethyl acrylate, in proportions as stated in the following table, together with 90 grams of isopropyl alcohol, 45 grams of water and 1 ml. of hydrogen peroxide as catalyst was sealed in a glas bottle. The monomers were polymerized by heating the bottle and contents at a temperature of 65° C. in a water bath while agitating the same over a period of 12 hours. The product was obtained as a colorless solution of about 33⅓ weight percent of the copolymer in the water-isopropanol solution. The solution of the copolymer was coated onto test panels of No. 26 gauge sheet steel and were dried in air for 30 minutes. The dry coating was heated in an oven at 350° F. for a period of 30 minutes to cure or insolubilize the same, then was removed from the oven and was allowed to cool to room temperature. The cured films were tested for adhension and flexibility by bending a test panel around a conical mandrel and observing the bend for peeling or cracking of the film at ⅛ and ¼ inch diameter bends. If there was no peeling or cracking at the ⅛ inch bend the film was rated E for excellent. If there was no peeling or cracking at the ¼ inch bend the film was rated G for good. Resistance of the film to water and softening was determined by immersing a portion of the coated test panel in water at 90° F. for 10 days and thereafter observing the film. The film was rated excellent if there was no observable softening, good if slight softening, and poor if appreciable softening. Table 1 identifies the experiments and gives the proportions of the monomers employed in making the copolymers. The table also gives the results of the tests for flexibility and water resistance of the cured film.

TABLE 1

| Run No. | Starting Materials | | | Cured Product | |
|---|---|---|---|---|---|
| | Ethyl Acrylate, percent | Acrylic Acid, percent | 2-hydroxy Ethyl Acrylate, percent | Flexibility | Resistance to Water |
| 1 | 10 | 20 | 70 | Excellent | Good. |
| 2 | 10 | 30 | 60 | do | Excellent. |
| 3 | 20 | 40 | 40 | Good | Do. |
| 4 | 40 | 40 | 20 | Excellent | Do. |
| 5 | 55 | 30 | 15 | do | Good. |
| 6 | 65 | 20 | 20 | | Do. |
| 7 | 40 | 10 | 50 | | |
| 8 | 30 | 40 | 30 | Excellent | Excellent. |
| 9 | 25 | 15 | 60 | | Good. |
| 10 | 50 | 18 | 32 | Excellent | Do. |
| 11 | 45 | 25 | 30 | do | Do. |
| 12 | 25 | 30 | 45 | do | Do. |
| 13 | 25 | 15 | 60 | do | Do. |
| 14 | 30 | 40 | 30 | do | Excellent. |
| 15 | 35 | 30 | 35 | do | Very good. |
| 17 | 26 | 23 | 51 | do | Do. |
| 18 | 20 | 30 | 50 | do | |
| 19 | 25 | 35 | 40 | do | Excellent. |
| 20 | 25 | 20 | 45 | do | Poor. |
| 21 | 38 | 24 | 38 | do | Do. |

*Example 3*

Into a reactor equipped with means for stirring and heating there was charged a mixture of 270 parts of butyl acrylate, 114 parts of acrylic acid, 110 parts of 2-hydroxyethyl acrylate, 910 parts of isopropanol, 1 part of lauryl peroxide and 10 parts of an aqueous solution of hydrogen peroxide containing 29 percent by weight of the hydrogen peroxide. The reactor was purged with nitrogen after which the temperature of the charge was raised to 65° C., at which temperature it was maintained during 12 hours, with stirring. A 97 percent conversion of total monomer charged occurred.

The acidity of the solution was determined and an amount of ammonium hydroxide equivalent to 30 percent of this value was added. The isopropanol was removed from the solution by distillation under reduced pressure. To the residue there was added an amount of water equal in volume to the isopropanol removed. A clear, colorless aqueous solution of polymer was obtained.

This aqueous solution was applied as a layer by brushing onto steel panels. The coating was dried in air and was baked at 340° F. for 30 minutes in an oven. The baked coating had high gloss and impact resistance, and possessed excellent resistance to solvents and water.

*Example 4*

The preparation of Example 3 was repeated with the substitution of isobutyl acrylate for the butyl acrylate of that example. The cured coatings were completely comparable to those of Example 3.

*Example 5*

Following the teaching of Example 3, except that a reaction temperature of 80° C. was employed, a polymer solution was prepared by polymerizing a mixture of 240 grams of styrene, 120 grams of 2-hydroxyethyl acrylate and 120 grams of acrylic acid in 700 grams of isopropyl alcohol employing 3 grams of benzoyl peroxide as catalyst. The product was a colorless solution of the tripolymer. A portion of the solution was coated onto steel test panels and was dried in air, then was baked at 340° F. in an oven for 30 minutes. The baked coatings were tough and strongly adhered to the metal substrate. The coatings were resistant to organic solvents and water and possessed good impact resistance.

*Example 6*

A polymer solution was prepared by polymerizing a mixture of 17 grams of butyl acrylate, 23 grams of methacrylic acid and 36 grams of 2-hydroxyethyl acrylate, dissolved in 134 grams of isopropyl alcohol, employing 0.2 gram of lauryl peroxide and 5 grams of an aqueous 29 weight percent solution of hydrogen peroxide as catalyst, and heating the mixture at a temperature of 80° C. for a period of 12 hours. The product was a colorless solution of the polymer. A portion of the polymer was coated onto steel test panels and was dried in air for 30 minutes then was baked at 340° F. for a period of 30 minutes. The baked or cured coating was insoluble in isopropyl alcohol and was resistant to cracking, swelling or peeling in contact with organic solvents or water. The coating was tough and was tightly adhered to the metal substrate. The coating possessed good impact resistance.

Similar results are obtained when the 2-hydroxyethyl acrylate used in the foregoing examples is replaced by hydroxypropyl acrylate or hydroxybutyl acrylate.

I claim:

1. A composition comprising a solution of an interpolymer consisting of (1) from 10 to 40 weight percent of an organic acid selected from the group consisting of acrylic acid and methacrylic acid, (2) from 10 to 65 weight percent of at least one monoethylenically unsaturated monomer selected from the group consisting of (a) an ester of said acids and a saturated aliphatic alcohol having from 1 to 8 carbon atoms in the molecule and (b) a monovinyl aromatic hydrocarbon, and (3) from 15 to 70 weight percent of at least one hydroxyalkyl ester selected from the group consisting of hydroxyalkyl esters of acrylic and methacrylic acids, which ester has from 2 to 4 carbon atoms in the hydroxyalkyl radical, the proportions of said ingredients being within the lines ABCDEFG of the trilinear diagram of drawing, and said interpolymer being soluble in a solvent selected from the group consisting of water, aliphatic alcohols containing from one to four carbons and mixtures of water and said alcohols.

2. A composition as claimed in claim 1 wherein the interpolymer is a copolymer of acrylic acid, ethyl acrylate and 2-hydroxyethyl acrylate.

3. A composition as claimed in claim 1 wherein the interpolymer is a copolymer of acrylic acid, butyl acrylate and 2-hydroxyethyl acrylate.

4. A composition as claimed in claim 1, wherein the interpolymer is a copolymer of acrylic acid, styrene and 2-hydroxyethyl acrylate.

5. A composition as claimed in claim 1 wherein the interpolymer is a copolymer of methacrylic acid, butyl acrylate and 2-hydroxyethyl acrylate.

6. A soluble interpolymer capable of being converted to an insoluble cross-linked polymeric material upon heating at elevated temperatures containing in chemically combined form (1) from 10 to 40 weight percent of an organic acid selected from the group consisting of acrylic acid and methacrylic acid; (2) from 10 to 65 weight percent of at least one monoethylenically unsaturated monomer selected from the group consisting of (a) an ester of said acids and a saturated aliphatic alcohol having from 1 to 8 carbon atoms in the molecule and (b) a monovinyl aromatic hydrocarbon, and (3) from 15 to 70 weight percent of at least one hydroxyalkyl ester selected from the group consisting of hydroxyl esters of acrylic and methacrylic acids, which ester has from 2 to 4 carbon atoms in the hydroxylalkyl radical, the proportions of said ingredients being within the lines ABCDEFG of the trilinear diagram of the drawing.

7. An interpolymer as claimed in claim 6, containing in chemically combined form acrylic acid, ethyl acrylate and 2-hydroxyethyl acrylate.

8. An interpolymer as claimed in claim 6, containing in chemically combined form acrylic acid, butyl acrylate and 2-hydroxyethyl acrylate.

9. An interpolymer as claimed in claim 6, containing in chemically combined form acrylic acid, styrene and 2-hydroxyethyl acrylate.

10. An interpolymer as claimed in claim 6, containing in chemically combined form methacrylic acid, butyl acrylate and 2-hydroxyethyl acrylate.

11. A method of making a soluble interpolymer capable of being converted to an insoluble cross-linked polymeric material upon heating at elevated temperatures, which method comprises polymerizing (1) from 10 to 40 weight percent of an organic acid selected from the group consisting of acrylic acid and methacrylic acid, (2) from 10 to 65 weight percent of at least one monoethylenically unsaturated monomer selected from the group consisting of (a) an ester of said acids and a saturated aliphatic alcohol having from 1 to 8 carbon atoms in the molecule and (b) a monovinyl aromatic hydrocarbon, and (3) from 15 to 70 weight percent of at least one hydroxyalkyl ester selected from the group consisting of hydroxyalkyl esters of acrylic and methacrylic acids which ester has from 2 to 4 carbon atoms in the hydroxyalkyl radical, the proportion of said ingredients being within the lines ABCDEFG of the trilinear diagram of the drawing, while having the ingredients dissolved in a solvent selected from the group consisting of water, aliphatic alcohols containing from one to four carbons and mixtures of water and said alcohols.

12. A method as claimed in claim 12, which interpolymerizes acrylic acid, ethyl acrylate and 2-hydroxyethyl acrylate.

13. A method as claimed in claim 12 which interpolymerizes acrylic acid, butyl acrylate and 2-hydroxyethyl acrylate.

14. A method as claimed in claim 12 which interpolymerizes acrylic acid, styrene and 2-hydroxyethyl acrylate.

15. A method as claimed in claim 12 which interpolymerizes methacrylic acid, butyl acrylate and 2-hydroxyethyl acrylate.

16. An insoluble cross-linked polymeric material resulting from the heating at elevated temperatures of a soluble interpolymer of (1) from 10 to 40 weight percent of an organic acid selected from the group consisting of acrylic acid and methacrylic acid, (2) from 10 to 65 weight percent of at least one monoethylenically unsaturated monomer selected from the group consisting of (a) an ester of said acids and a saturated aliphatic alcohol having from 1 to 8 carbon atoms in the molecule, and (b) a monovinyl aromatic hydrocarbon, and (3) from 15 to 70 weight percent of at least one hydroxyalkyl ester selected from the group consisting of hydroxyalkyl esters of acrylic and methacrylic acids, which ester has from 2 to 4 carbon atoms in the hydroxyalkyl radical, the proportions of said monomers chemically combined in the interpolymer being within the lines ABCDEFG of the trilinear diagram of the drawing.

17. An insoluble cross-linked polymeric material as claimed in claim 16, wherein the interpolymer contains in chemically combined form acrylic acid, ethyl acrylate and 2-hydroxyethyl acrylate.

18. An insoluble cross-linked polymeric material as claimed in claim 16, wherein the interpolymer contains in chemically combined form acrylic acid, butyl acrylate and 2-hydroxyethyl acrylate.

19. An insoluble cross-linked polymeric material as claimed in claim 16, wherein the interpolymer contains in chemically combined form acrylic acid, styrene and 2-hydroxyethyl acrylate.

20. An insoluble cross-linked polymeric material as claimed in claim 16, wherein the interpolymer contains in chemically combined form methacrylic acid, butyl acrylate and 2-hydroxyethyl acrylate.

References Cited by the Examiner

UNITED STATES PATENTS 2,819,237  1/1958  Daniel _____ 260—80.5
2,991,260  6/1961  Auer et al. _____ 260—29.6

MURRAY TILLMAN, *Primary Examiner.*

J. ZIEGLER, *Assistant Examiner.*